(12) United States Patent
Pladson

(10) Patent No.: US 12,358,120 B2
(45) Date of Patent: *Jul. 15, 2025

(54) AUXILIARY ATTACHMENT

(71) Applicant: Reach Right, LLC, Fargo, ND (US)

(72) Inventor: James Pladson, Fargo, ND (US)

(73) Assignee: Reach Right, LLC, Fargo, ND (US)

(*) Notice: Subject to any disclaimer, the term of this patent is extended or adjusted under 35 U.S.C. 154(b) by 110 days.

This patent is subject to a terminal disclaimer.

(21) Appl. No.: 18/489,820

(22) Filed: Oct. 18, 2023

(65) Prior Publication Data

US 2024/0308054 A1 Sep. 19, 2024

Related U.S. Application Data

(63) Continuation-in-part of application No. 18/191,588, filed on Mar. 28, 2023, now Pat. No. 11,794,329, which is a continuation-in-part of application No. 18/185,361, filed on Mar. 16, 2023, now Pat. No. 11,717,952.

(51) Int. Cl.
*B25G 3/20* (2006.01)
*F16B 2/06* (2006.01)
*F16B 2/10* (2006.01)

(52) U.S. Cl.
CPC ............ *B25G 3/20* (2013.01); *F16B 2/065* (2013.01); *F16B 2/10* (2013.01)

(58) Field of Classification Search
CPC ... B25G 3/20; B25G 3/34; B25G 3/26; B25G 3/38; B25G 1/10; A01B 1/026; A01D 34/902; B25F 5/026; F16B 2/065; F16B 2/10
See application file for complete search history.

(56) References Cited

U.S. PATENT DOCUMENTS

| | | | | |
|---|---|---|---|---|
| 1,534,075 A | * | 4/1925 | Parrish | A01B 1/026 |
| | | | | 294/58 |
| 4,155,582 A | * | 5/1979 | Reisner | B25G 3/14 |
| | | | | 294/58 |
| 4,838,465 A | * | 6/1989 | Metzger | E04G 21/04 |
| | | | | 222/526 |
| 5,065,475 A | * | 11/1991 | Watt | B25G 1/00 |
| | | | | 294/58 |
| D347,986 S | * | 6/1994 | Booth | D8/107 |

(Continued)

OTHER PUBLICATIONS

Raymond Anthony Products, The RAH! Handle, https://powxr.com/rah_handle/, Mar. 16, 2023, Raymond Anthony Products.

(Continued)

*Primary Examiner* — Jeffrey O'Brien
(74) *Attorney, Agent, or Firm* — Fargo Patent & Business Law; Thomas Kading; Joshua Krank

(57) ABSTRACT

A clamp structure includes a first female member adjacent to a first channel member comprising a first channel closed side along an axis to receive a member along the axis, the first female member pivots about a first female member axis parallel to the axis; a male member mounted along a first male member axis parallel to the axis; a threaded fastener that extends through the male member transverse to the first male member axis; and a first wing nut threaded to the threaded fastener.

24 Claims, 18 Drawing Sheets

(56) References Cited

U.S. PATENT DOCUMENTS

| | | | | |
|---|---|---|---|---|
| 5,331,720 | A * | 7/1994 | Beckingham | A47L 13/00 294/58 |
| 6,601,887 | B2 * | 8/2003 | Graves | A01B 1/026 294/58 |
| D484,023 | S * | 12/2003 | Stout | D8/107 |
| 7,384,078 | B2 * | 6/2008 | Cobb | F16B 2/10 285/410 |
| 7,971,914 | B1 * | 7/2011 | Pladson | A01B 1/026 294/58 |
| 8,032,990 | B2 * | 10/2011 | Shinma | B25F 5/026 16/426 |
| 8,181,436 | B1 * | 5/2012 | McMillan | B25G 1/06 56/400.06 |
| 8,562,238 | B2 * | 10/2013 | Hasei | B62K 21/16 403/396 |
| D711,730 | S * | 8/2014 | McKiernan | D8/396 |
| 8,893,355 | B2 * | 11/2014 | Longley | B25G 1/00 294/58 |
| 9,151,420 | B2 * | 10/2015 | McKiernan | F16L 23/10 |
| 9,775,272 | B1 * | 10/2017 | Gilbert | B25G 1/06 |
| D948,974 | S * | 4/2022 | Chouikh | D8/10 |
| 11,717,952 | B1 | 8/2023 | Pladson | |
| D1,036,247 | S * | 7/2024 | Sillitoe | D8/396 |
| D1,036,248 | S * | 7/2024 | Sillitoe | D8/396 |
| 2003/0057721 | A1 * | 3/2003 | Ducklow | B25G 1/00 294/58 |
| 2007/0209162 | A1 * | 9/2007 | McRoberts | B25F 5/026 16/426 |
| 2012/0085205 | A1 * | 4/2012 | Quick | A01D 34/824 81/489 |
| 2014/0260839 | A1 * | 9/2014 | Hurley | B25F 5/026 81/489 |
| 2018/0359899 | A1 | 12/2018 | Cote | |
| 2023/0213048 | A1 * | 7/2023 | Andersen | F16B 2/065 29/402.01 |

OTHER PUBLICATIONS

Gaim Engineering, Inc., The HEFT Secondary Auxiliary Handle, https://www.gaimproducts.com/the-heft, Mar. 16, 2023, GAIM Engineering, Inc.

Cinelight Studio Lights & Accessories, C-210 Baby Pipe Clamp with Spigot 16 mm Pin, https://cinelight.com/studio-clamps/c-210-baby-pipe-clamp-with-spigot-16-mm-pin, Oct. 17, 2023, Cineart.

Cinelight Studio Lights & Accessories, Grid Clamp with 16 mm spigot 38-52 mm, https://cinelight.com/stage-studio-couplers/grid-clamp-with-16-mm-spigot-38-52-mm, Oct. 17, 2023, Cineart.

* cited by examiner

AUXILIARY ATTACHMENT

CROSS-REFERENCE TO RELATED APPLICATION(S)

The present disclosure is a Continuation-In-Part of U.S. patent application Ser. No. 18/191,588 filed Mar. 28, 2023 which issues Oct. 24, 2023 as U.S. Pat. No. 11,794,329, which is a continuation-in-part of U.S. patent application Ser. No. 18/185,361 filed Mar. 16, 2023 which issued Aug. 8, 2023 as U.S. Pat. No. 11,717,952.

The contents of each aforementioned patent application are hereby incorporated by reference in their entirety.

BACKGROUND

The present disclosure relates generally to an auxiliary attachment.

Typically, when using long-handled tools, such as shovels, brooms, rakes, hoes, and the like, the user must repeatedly bend over to lift, push, and/or control the tool. This may result in the user having to extend beyond a comfortable range of motion.

SUMMARY

A clamp structure according to one disclosed non-limiting embodiment of the present disclosure includes a first female member adjacent to a first channel member comprising a first channel closed side along an axis to receive a member along the axis, the first female member pivots about a first female member axis parallel to the axis; a male member mounted along a first male member axis parallel to the axis; a threaded fastener that extends through the male member transverse to the first male member axis; and a first wing nut threaded to the threaded fastener.

A further embodiment of any of the foregoing embodiments of the present disclosure includes that the member comprises a portion of a device.

A further embodiment of any of the foregoing embodiments of the present disclosure includes a second clamp structure coaxial with the first clamp structure to clamp the member to a second channel member comprising a second channel closed side, the first channel closed side aligned with the second channel closed side along the axis to collectively receive the member along the axis.

A further embodiment of any of the foregoing embodiments of the present disclosure includes that the first channel closed side forms a V-shape and the second channel closed side forms a V-shape.

A further embodiment of any of the foregoing embodiments of the present disclosure includes that the first channel closed side is contiguous with the second channel closed side.

A further embodiment of any of the foregoing embodiments of the present disclosure includes a body transverse to the axis; and a handle that extends from the body.

A further embodiment of any of the foregoing embodiments of the present disclosure includes that the body is unitary.

A further embodiment of any of the foregoing embodiments of the present disclosure includes that the body extends between the first channel closed side and the second channel closed side.

A further embodiment of any of the foregoing embodiments of the present disclosure includes that the first wing nut is partially received within a first slot in the first female member to clamp the first female member against the member to clamp the member against the first channel closed side.

A further embodiment of any of the foregoing embodiments of the present disclosure includes a threaded fastener attached to the first channel closed side transverse to the first male member axis and the first female member axis.

A further embodiment of any of the foregoing embodiments of the present disclosure includes a head on the threaded fastener, the head captured within the first channel closed side.

A further embodiment of any of the foregoing embodiments of the present disclosure includes that the first channel closed side forms a V-shape.

A further embodiment of any of the foregoing embodiments of the present disclosure includes that the head is located within the V-shape.

A further embodiment of any of the foregoing embodiments of the present disclosure includes that the head is convex.

A further embodiment of any of the foregoing embodiments of the present disclosure includes that the threaded fastener is manufactured of a metal alloy and the first channel closed side is manufactured of a non-metallic material.

A clamp structure according to one disclosed non-limiting embodiment of the present disclosure includes a first female member adjacent to a first channel member comprising a first channel closed side along an axis to receive a member along the axis; a first male member arm that pivots about a first male member axis parallel to the axis; a T-handle pivot along the first male member arm to define an arm axis parallel to the axis; a threaded fastener that extends through the T-handle pivot; and a first wing nut mounted to the threaded fastener, the first male member arm pivotable about the first male member axis and the first wing nut pivotable about the arm axis such that the first wing nut is engageable with the first female member to clamp the first female member against the member to clamp the member against the first channel closed side.

A further embodiment of any of the foregoing embodiments of the present disclosure includes a body transverse to the axis; and a handle that extends from the body, the wing nut extends upwards toward the body and away from the axis when secured to the first female member.

A further embodiment of any of the foregoing embodiments of the present disclosure includes that the wing nut is within 15 degrees of parallel with the body.

An auxiliary attachment according to one disclosed non-limiting embodiment of the present disclosure includes a first channel member comprising a first channel closed side along an axis to receive a member along the axis; a first clamp structure attached to the first channel member to clamp the member to the first channel closed side; a body transverse to the axis; and a handle that extends from the body.

A further embodiment of any of the foregoing embodiments of the present disclosure includes that the first clamp structure comprises a first female member that pivots about a first female member axis and a first male member that pivots about a first male member axis, the first female member axis and the first male member axis parallel to the axis.

A further embodiment of any of the foregoing embodiments of the present disclosure includes that the first male member comprises a threaded fastener transverse to the first male member axis and a first wing nut threaded to the threaded fastener.

A further embodiment of any of the foregoing embodiments of the present disclosure includes that the first channel member comprises a first channel closed side forming a V-shape.

A further embodiment of any of the foregoing embodiments of the present disclosure includes a second clamp structure coaxial with the first clamp structure to clamp the member.

A further embodiment of any of the foregoing embodiments of the present disclosure includes a second channel member comprising a second channel closed side, the first channel closed side aligned with the second channel closed side along the axis to collectively receive the member along the axis.

A further embodiment of any of the foregoing embodiments of the present disclosure includes that the first channel member comprises a first channel closed side forming a V-shape and the second channel member comprises a second channel closed side forming a V-shape.

A further embodiment of any of the foregoing embodiments of the present disclosure includes that the first channel closed side is contiguous with the second channel closed side.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1A:
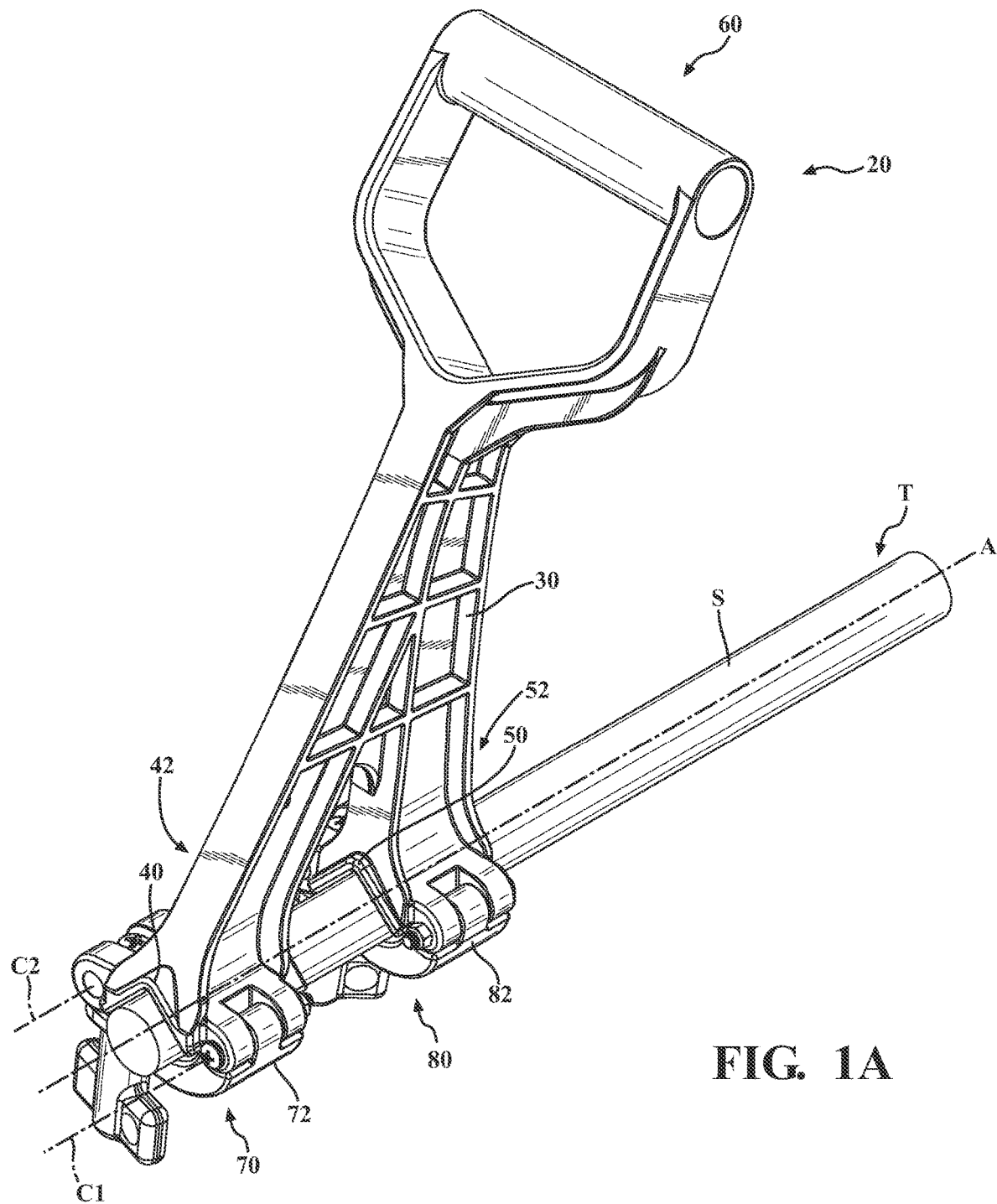
FIG. 1A is a perspective view of an auxiliary attachment according to one disclosed non-limiting embodiment.
Figure 1B:
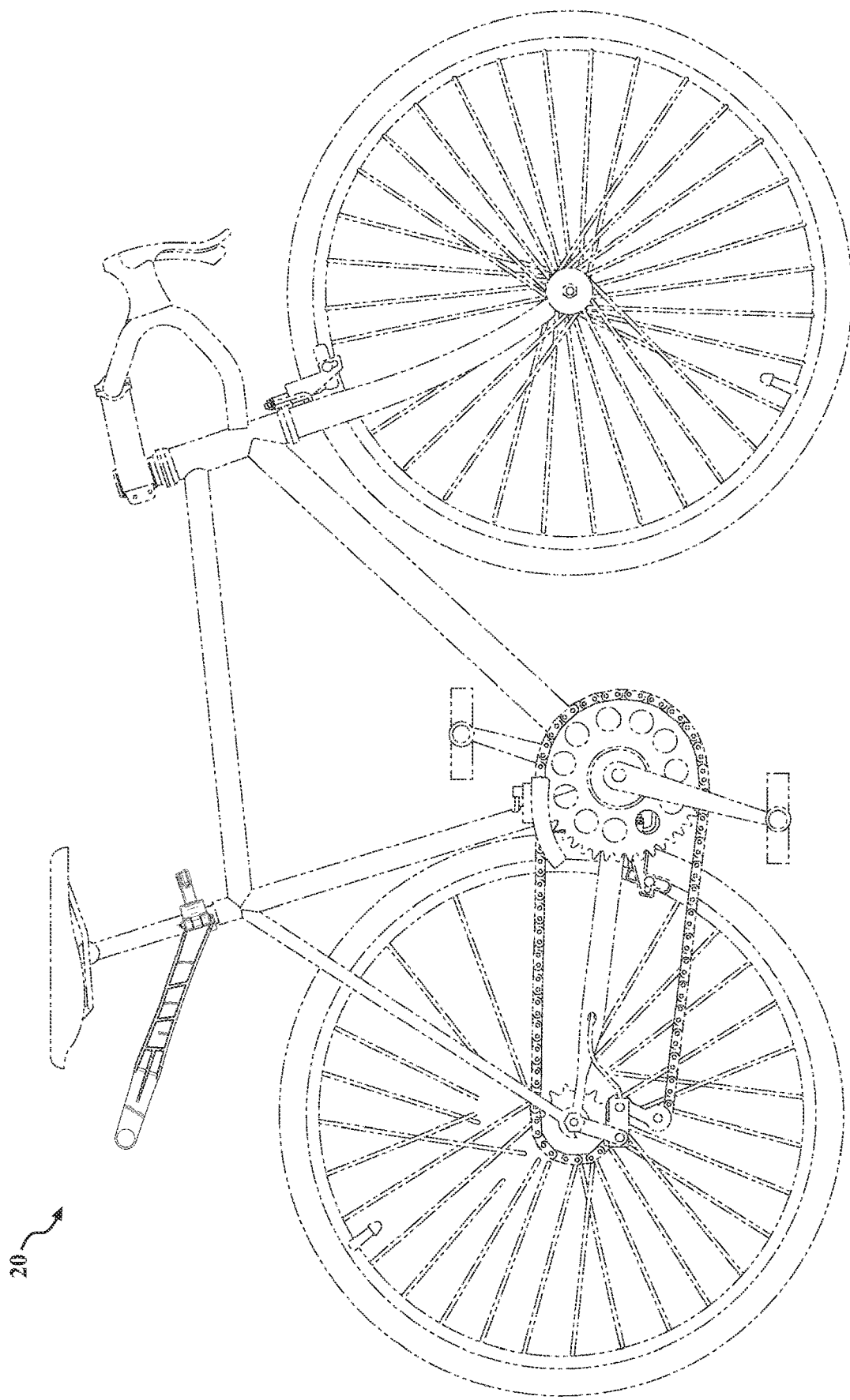
FIG. 1B is a perspective view of the auxiliary attachment attached to a member that is a part of an example bicycle.

FIG. 1A schematically illustrates an auxiliary attachment 20 for a member S such as an elongated member such as that found on a long-handled tool T, an assembly such as a bicycle (FIG. 1B), a light assembly (FIG. 1C), or other tool, device, assembly, etc., to which the auxiliary attachment 20 may be attached. The long-handled tool T may include, for example, shovels, brooms, rakes, hoes, etc. The cross-sectional profile of the member S may include, but is not limited to, circular, polygonal, triangular, square, rectangular, hexagonal, octagonal, etc., type shape. The member S in one example may typically have a diameter from, for example, ½-2 inches, but other sizes may alternatively be used herewith.

Figure 2:
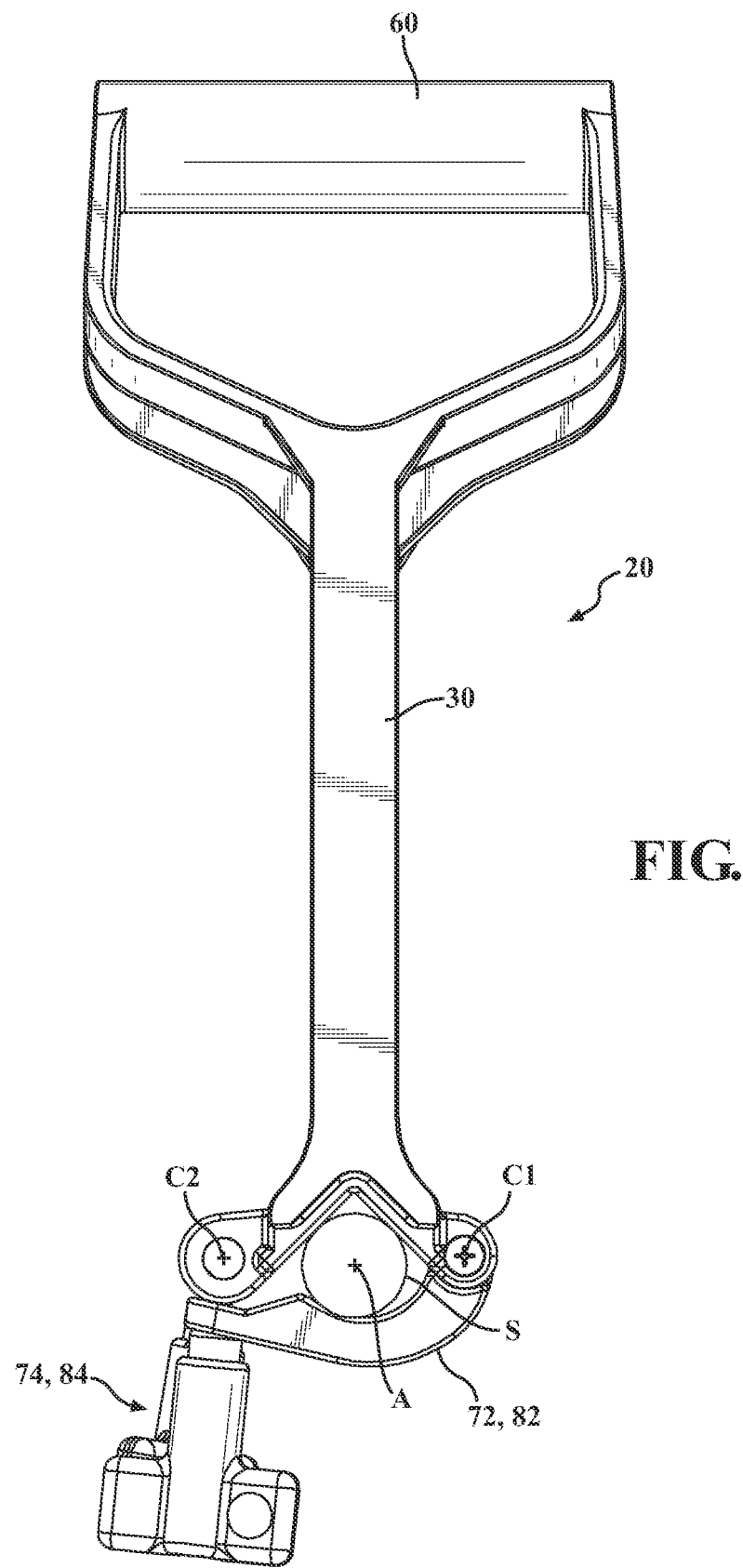
FIG. 2 is a perspective front view of the auxiliary attachment.

The auxiliary attachment 20 generally includes a body 30 that splits to form a first channel closed side 40 of a first channel member 42 and a second channel closed side 50 of a second channel member 52. The first channel closed side 40 is aligned with the second channel closed side 50 along the axis A to collectively receive the member S T. The first channel closed side 40 and the second channel closed side 50 may each be of a V-shape (FIG. 2) to abut the member S along the axis A.

A handle 60 extends from the body 30 transverse to an axis A. The body 30, the first channel closed side 40, the second channel closed side 50 and the handle 60 may be integrally formed and manufactured of, for example, an injected molded non-metallic thermoplastic polymer material such as, for example only, acrylic (PMMA), acrylonitrile butadiene styrene (ABS), nylon polyamide (PA), polycarbonate (PC), polyethylene (PE), polyoxymethylene (POM), polypropylene (PP), polystyrene (PS), thermoplastic elastomer (TPE), thermoplastic polyurethane (TPU), etc. Other materials may include metal and metal alloys. Various ribs and other structures may be incorporated to provide a robust lightweight structure.

A first clamp structure 70 is attached to the first channel member 42 to clamp the member S to the first channel closed side 40. A second clamp structure 80 is attached to the second channel member 52 to clamp the member S to the second channel closed side 50. The first and second clamp structure 70, 80 each provide for at least three-points of contact to secure the tool T.

The first and second clamp structure 70, 80 each include a female member 72, 82 that pivots about a female member axis C1 and a male member 74, 84 that pivots about a male member axis C2. The female member axis C1 and the male member axis C2 are parallel to the axis A. That is, the male member axis C2 and the female member axis C1 of the first and second clamp structure 70, 80 are parallel to the axis A.

Figure 3:
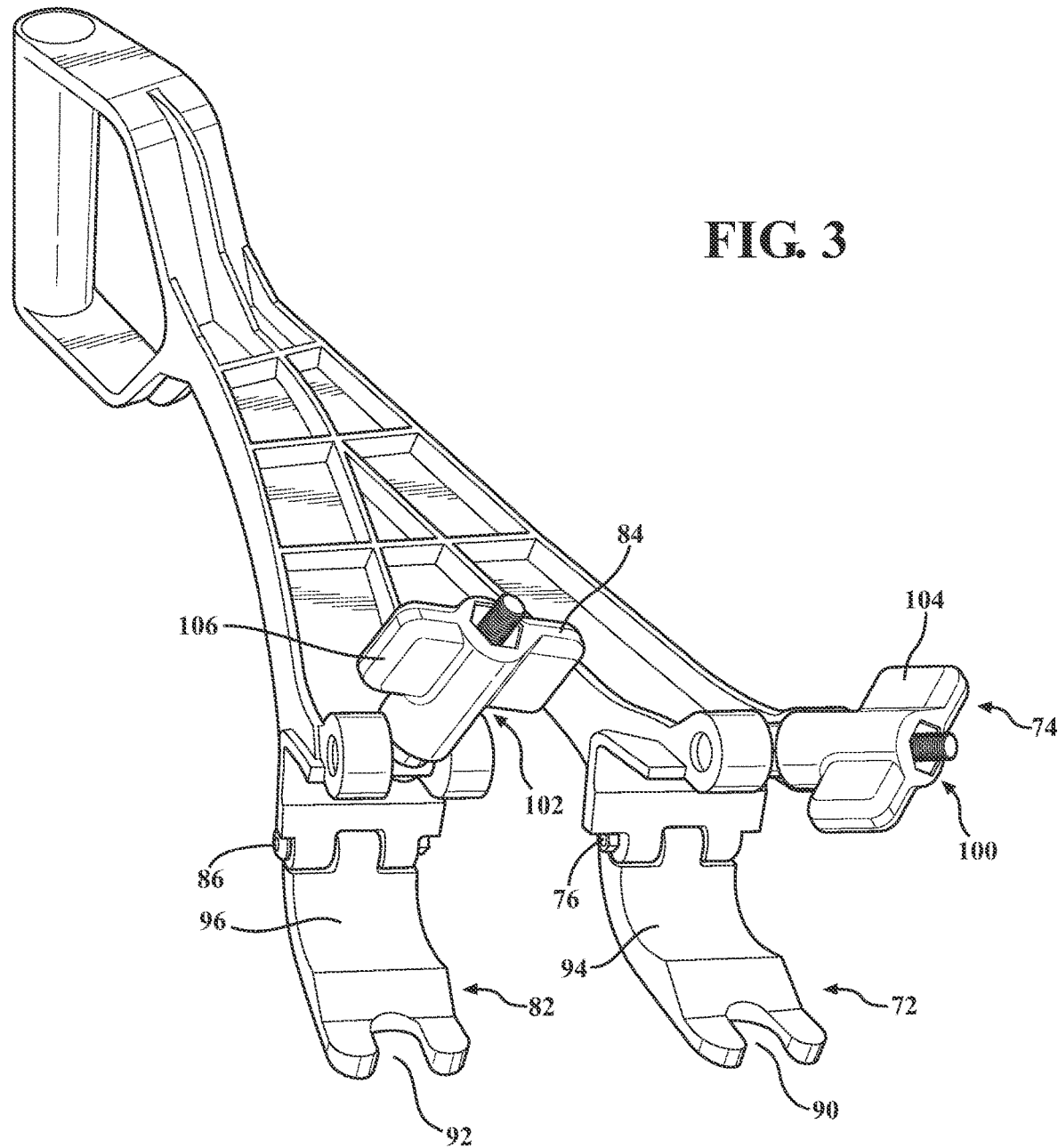
FIG. 3 is a perspective view of the auxiliary attachment showing the first and second clamp structure in an open position.

The pivot 76, 86 (FIG. 3) for each female member 72, 82 that form the female member axis C1, and the pivot 78, 88

Figure 4:
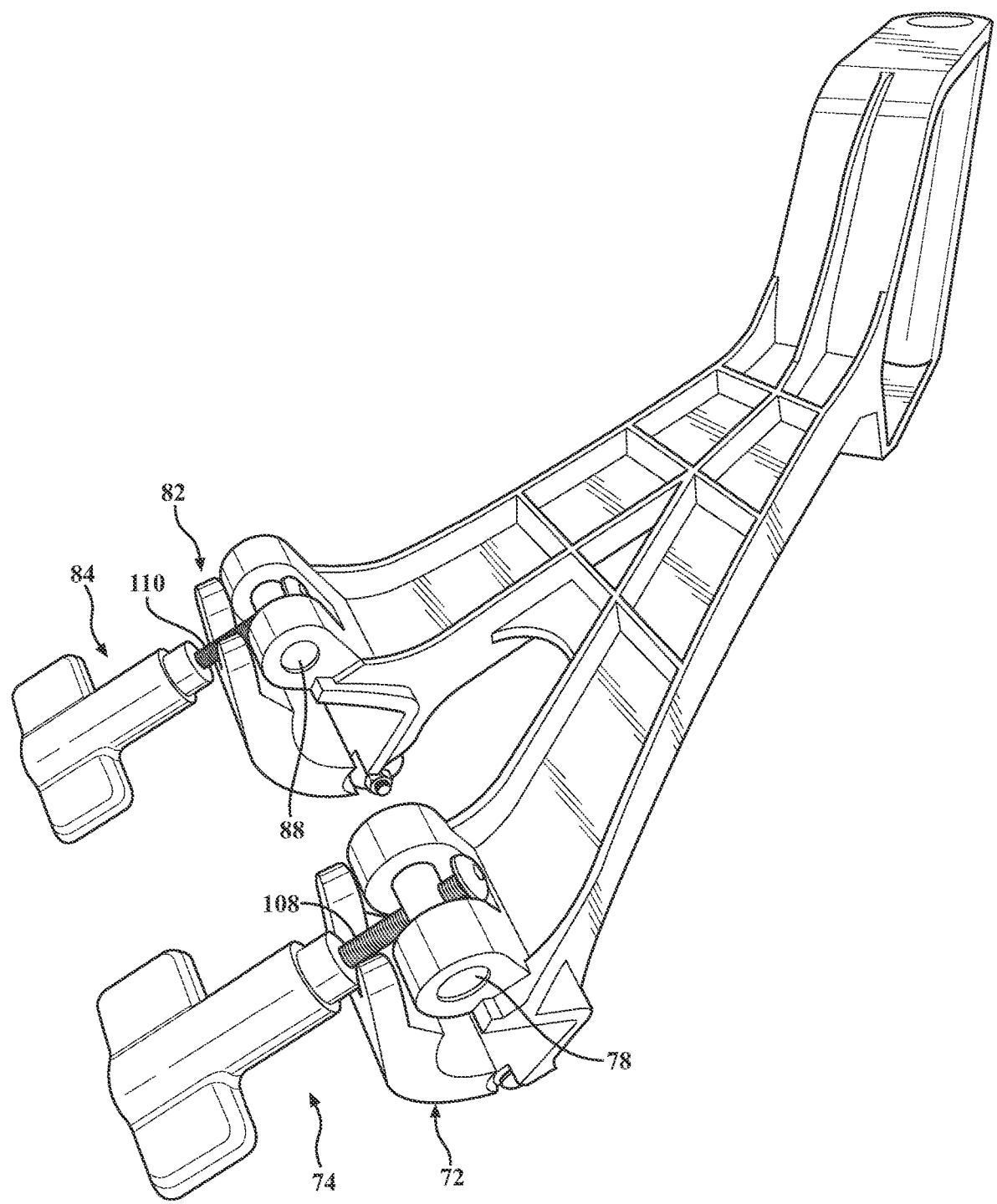
FIG. 4 is a perspective view of the auxiliary attachment showing the first and second clamp structure in a partially closed position.

(FIG. 4) for each male member 74, 84 that form the male member axis C2 may be defined by pins, screws, or other such bushings which are received into the body 30 to provide a strong, secure attachment for the respective first and second clamp structure 70, 80.

Each female member 72, 82 includes a respective slot 90, 92 (FIG. 3) within which is received a respective threaded fastener 108, 110 that supports a wing nut 100, 102 (FIG. 4) of each male member 74, 84. Each female member 72, 82 may include an arcuate surface 94, 96 which engages the member S and clamps the member S against the V-shape of the first channel closed side 40 and the second channel closed side 50. The arcuate surface 94, 96 are opposite the V-shape of the respective first channel closed side 40 and the second channel closed side 50 to provide significant retentive force when the wing nut 100, 102 is threaded toward the respective female member 72, 82.

Figure 5:
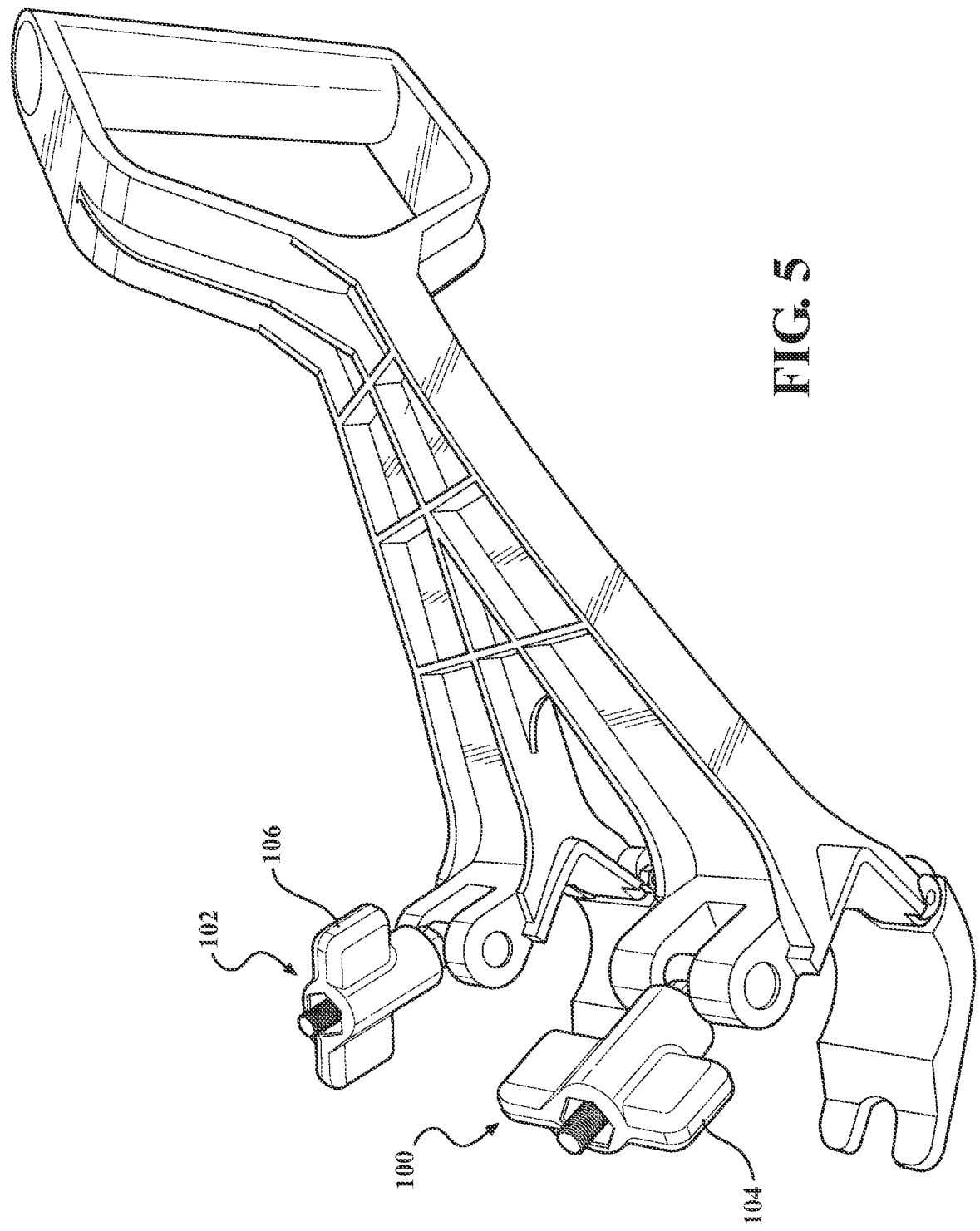
FIG. 5 is another perspective view of the auxiliary attachment showing the first and second clamp structure in an open position.
Figure 6:
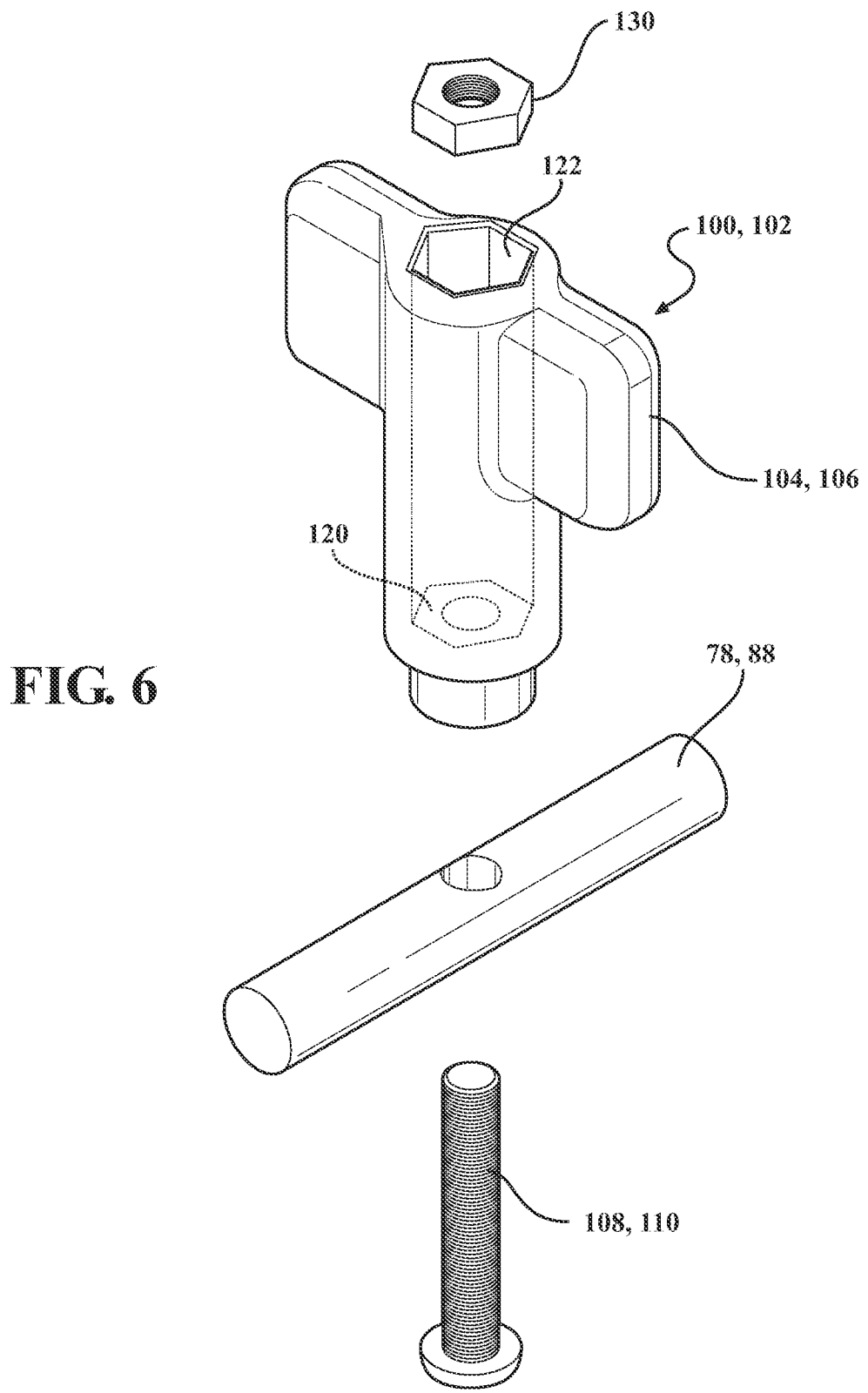
FIG. 6 is a perspective exploded view of a wing nut of each clamp structure.
Figure 7:
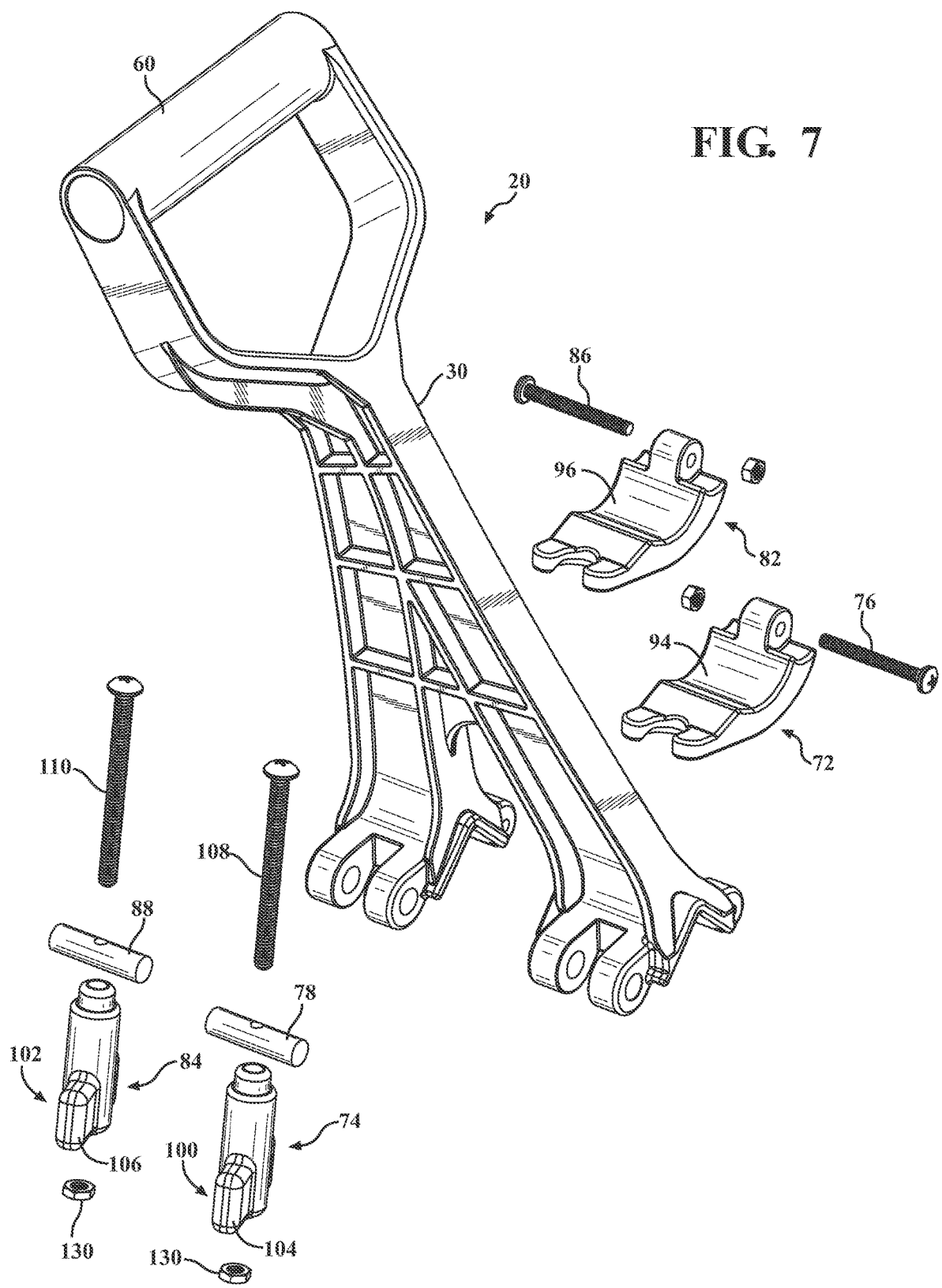
FIG. 7 is an exploded view of the auxiliary attachment.

Each wing nut 100, 102 of each male member 74, 84 includes a respective set of wings 104, 106 (FIG. 5) which allow for hand tightening of each the wing nut 100, 102 onto the respective threaded fastener 108, 110. In one embodiment, each respective threaded fastener 108, 110 may extend through the pivot 78, 88 and through the respective wing nut 100, 102 such that a nut 130 is retained against a shelf 120 within a corresponding opening 122 in the wing nut 100, 102 (FIG. 6 and FIG. 7), the opening 122 of a size and shape which prevents rotation of the nut 130, for example, a polygonal opening. That is, the wing nut 100, 102 may be hand tightened which tightens the nut 130 onto the respective threaded fastener 108, 110 and tightens the wing nut 100, 102 against the female member 72, 82 as the threaded fastener 108, 110 extends through the slot 90, 92. Alternatively, each respective threaded fastener 108, 110 may be threaded, welded or otherwise secured to the pivot 78, 88.

Figure 8:
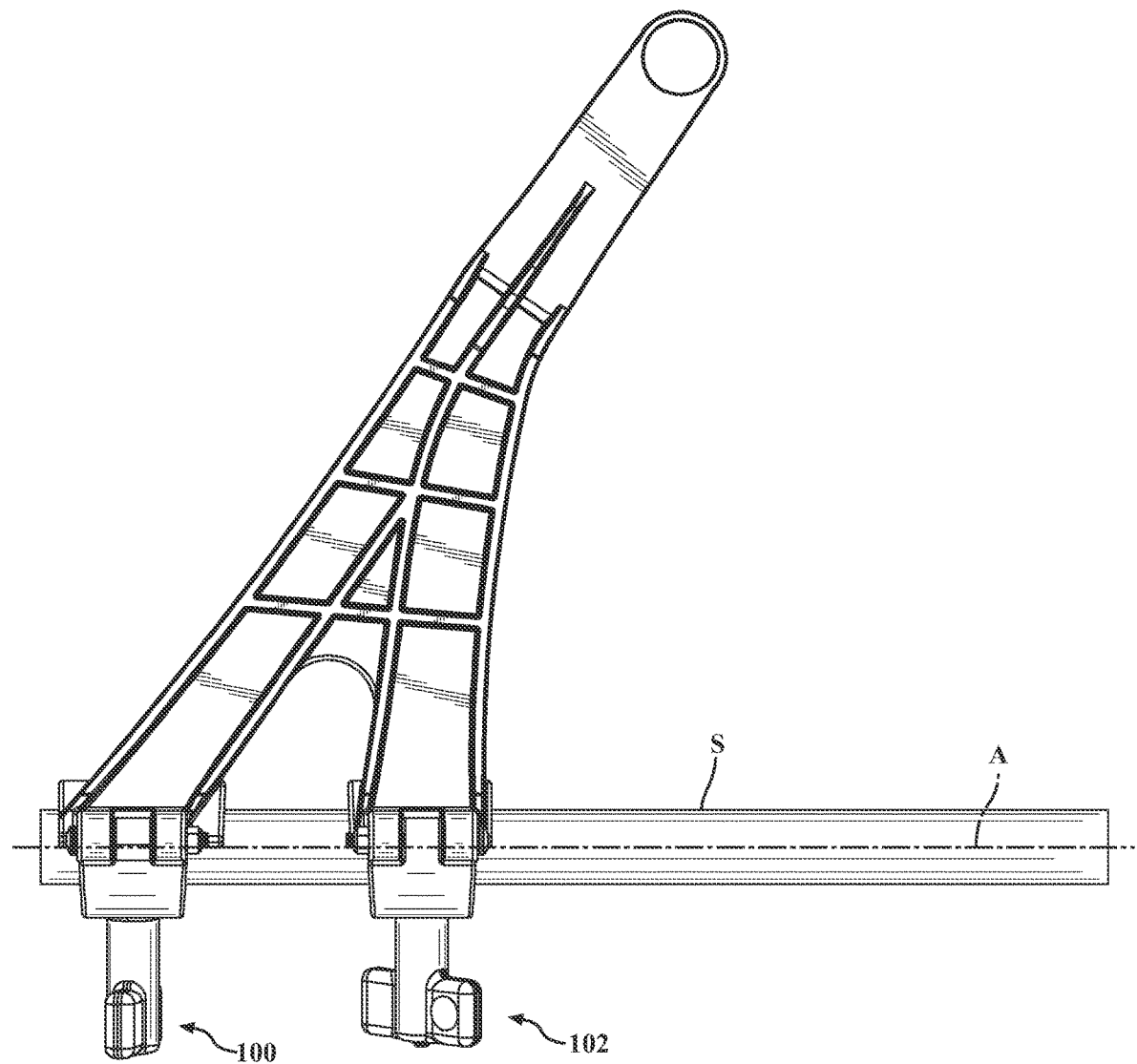
FIG. 8 is a side view of the auxiliary attachment.

In use, the first channel closed side 40 and the second channel closed side 50 is placed onto the member S along the axis A. Each female member 72, 82 is then pivoted about the female member axis C1 to partially enclose the member S. The male member 74, 84 is then pivoted about the male member axis C2 such that the respective threaded fastener 108, 110 extends through the respective slot 90, 92. Each wing nut 100, 102 is then tightened along the respective threaded fastener 108, 110 such that each wing nut 100, 102 of each male member 74, 84 is engaged against the respective female member 72, 82 which is clamped against the member S. The auxiliary attachment 20 provides three points of contact per each first and second clamp structure 70, 80 that utilizes the V-shape. The auxiliary attachment 20 is thereby secured to the member S (FIG. 8).

Figure 9:
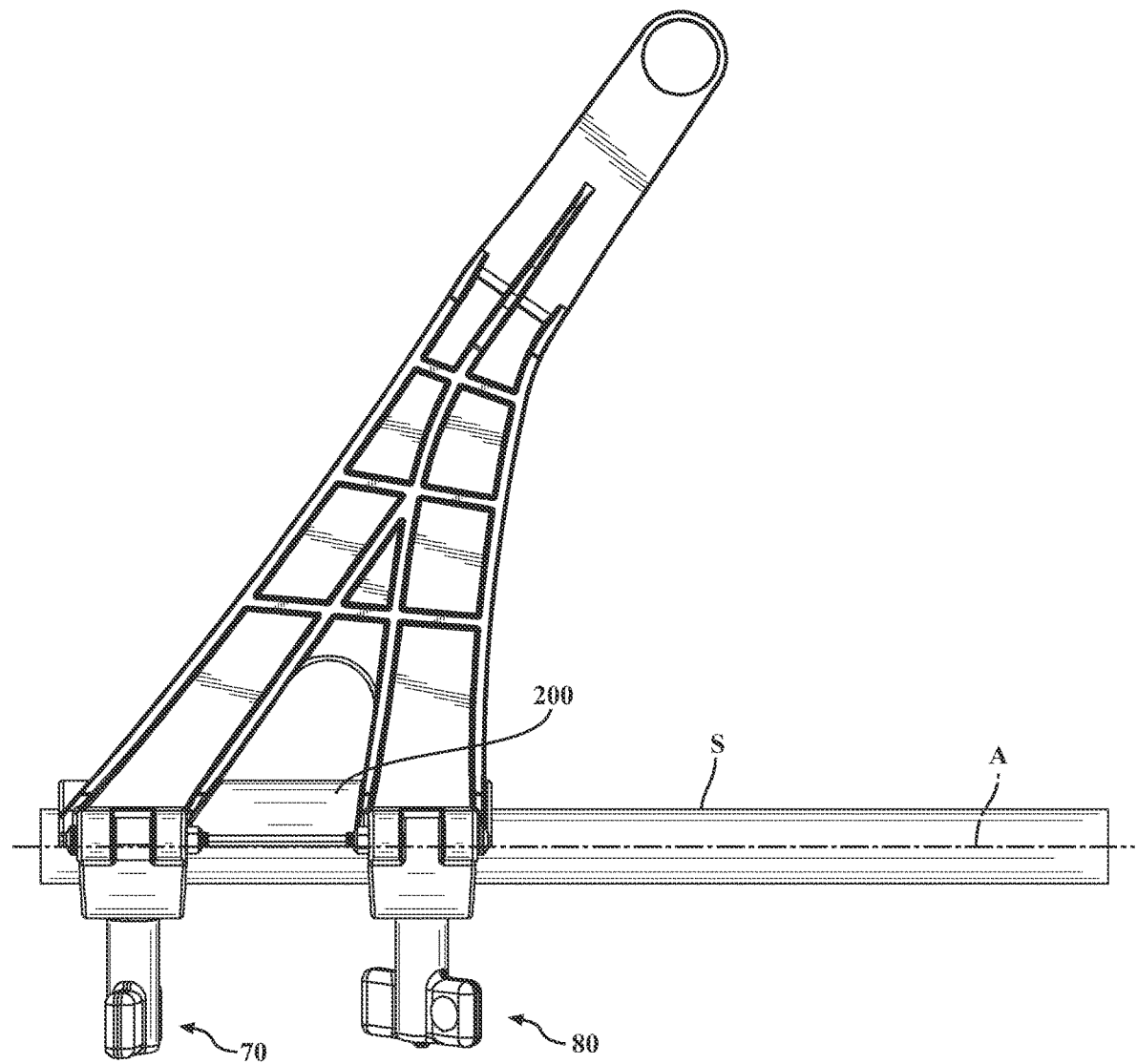
FIG. 9 is a side view of an auxiliary attachment according to another disclosed non-limiting embodiment.

With reference to FIG. 9, in another embodiment, the first and second clamp structure 70, 80 are adjacent to a contiguous channel side 200 to receive the member S. That is, the discrete first channel member 42 and the second channel member 52 discussed above are essentially merged to form the contiguous channel side 200 which may be, for example, V-shaped, or U-shaped in cross-section along the length thereof. Alternatively, the cross-section may change along the length.

Figure 10:
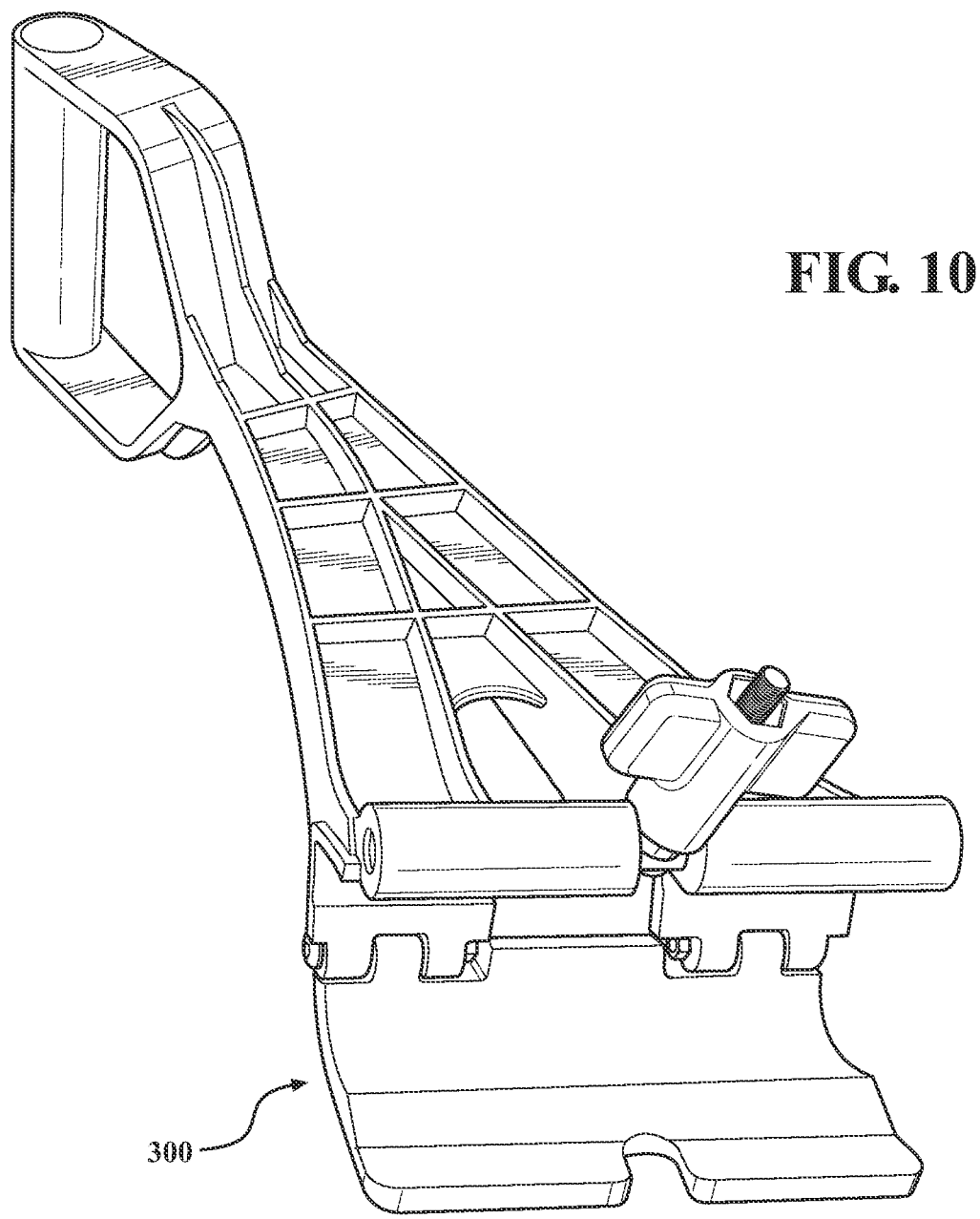
FIG. 10 is a perspective view of an auxiliary attachment according to another disclosed non-limiting embodiment.
Figure 11:
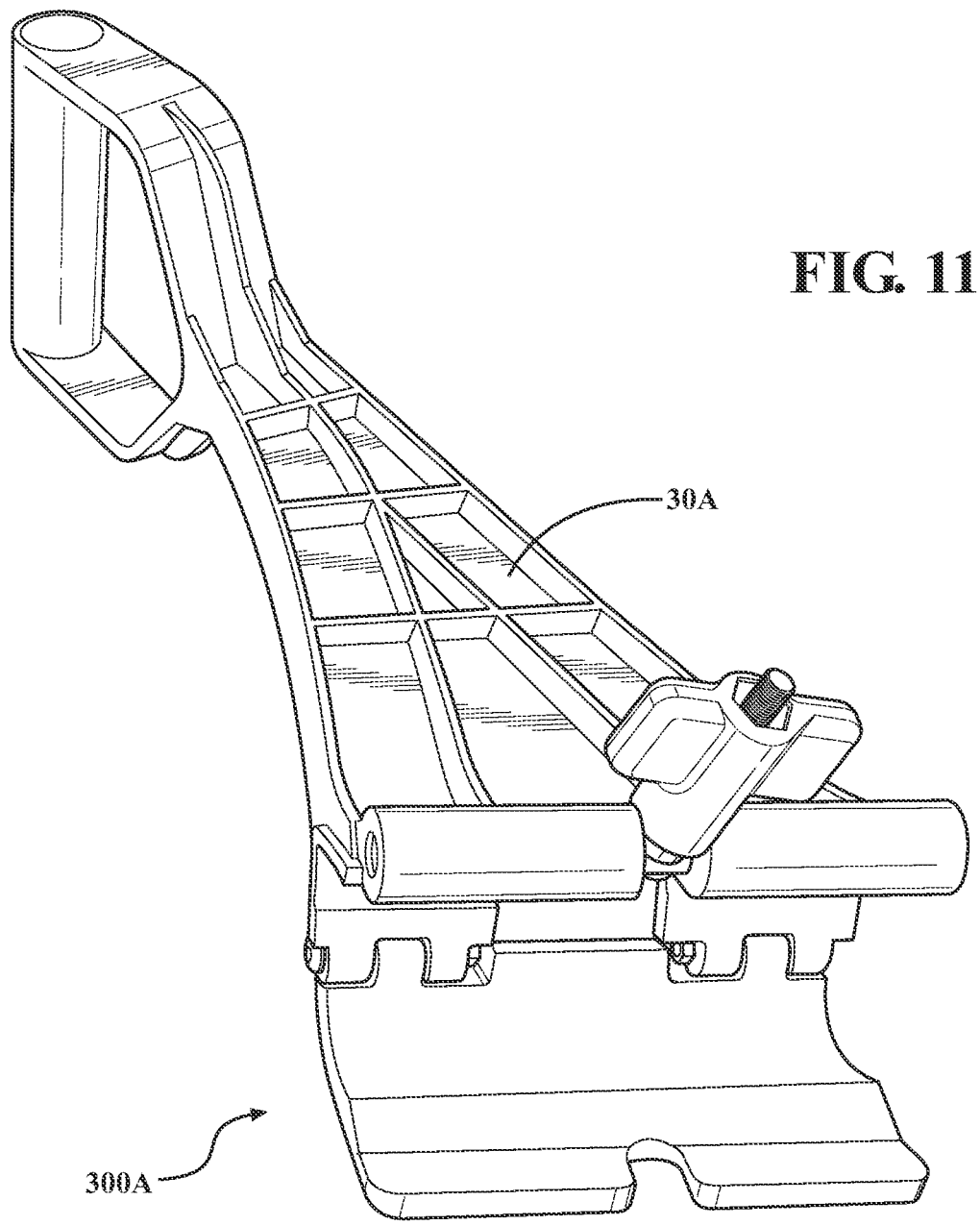
FIG. 11 is a perspective view of an auxiliary attachment according to another disclosed non-limiting embodiment.
Figure 12:
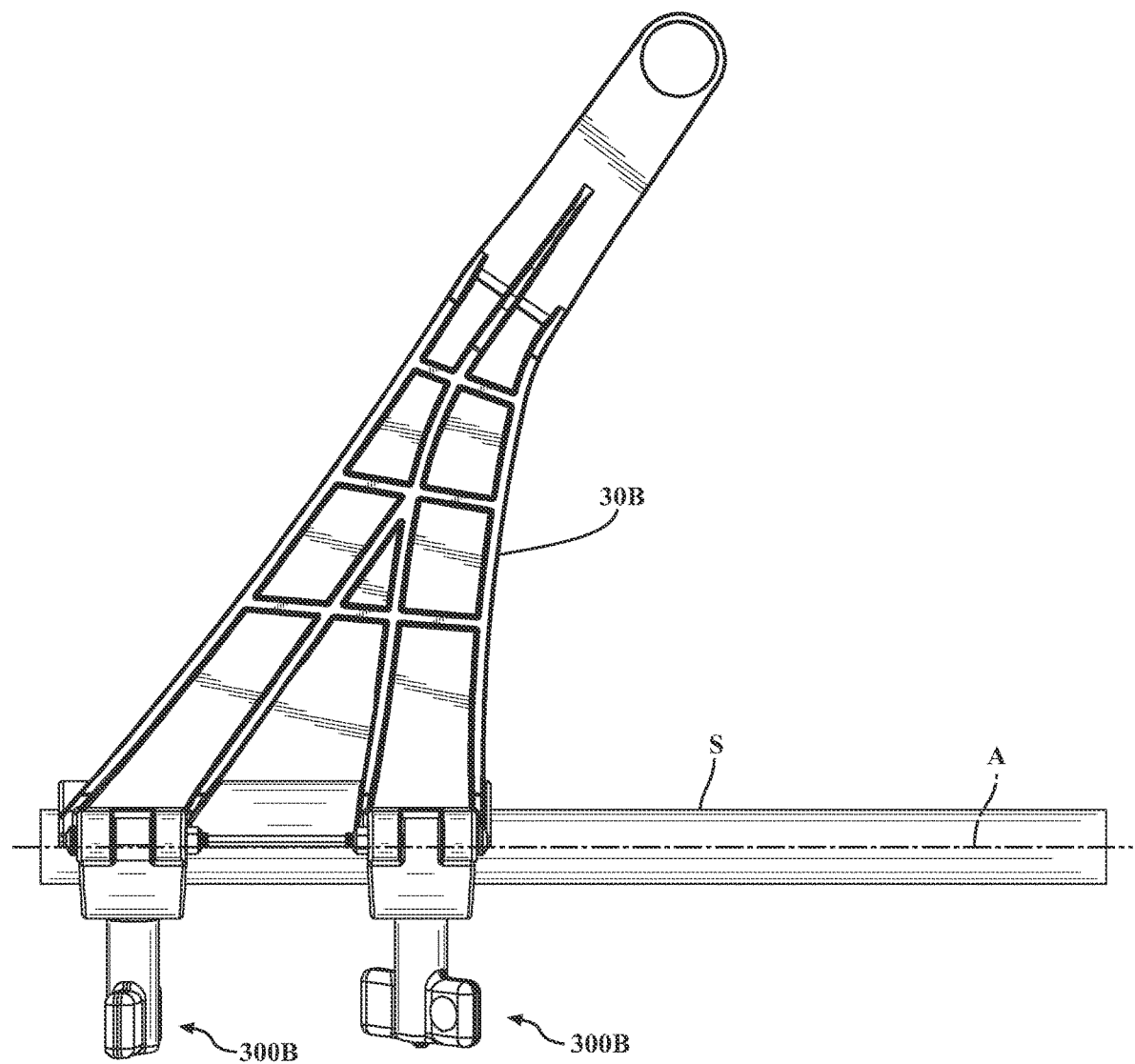
FIG. 12 is a perspective view of an auxiliary attachment according to another disclosed non-limiting embodiment.

With reference to FIG. 10, in another embodiment, the auxiliary attachment 20 includes a single extended first clamp structure 300 adjacent to the contiguous channel side 200 as shown in FIG. 9. Alternatively, in another embodiment, the auxiliary attachment 20 may include a single unitary body 30A with a contiguous single clamp structure 300A (FIG. 11). Alternatively, in another embodiment, the auxiliary attachment 20 may include a single unitary body 30B with a split dual clamp structure 300B (FIG. 12).

Figure 13:
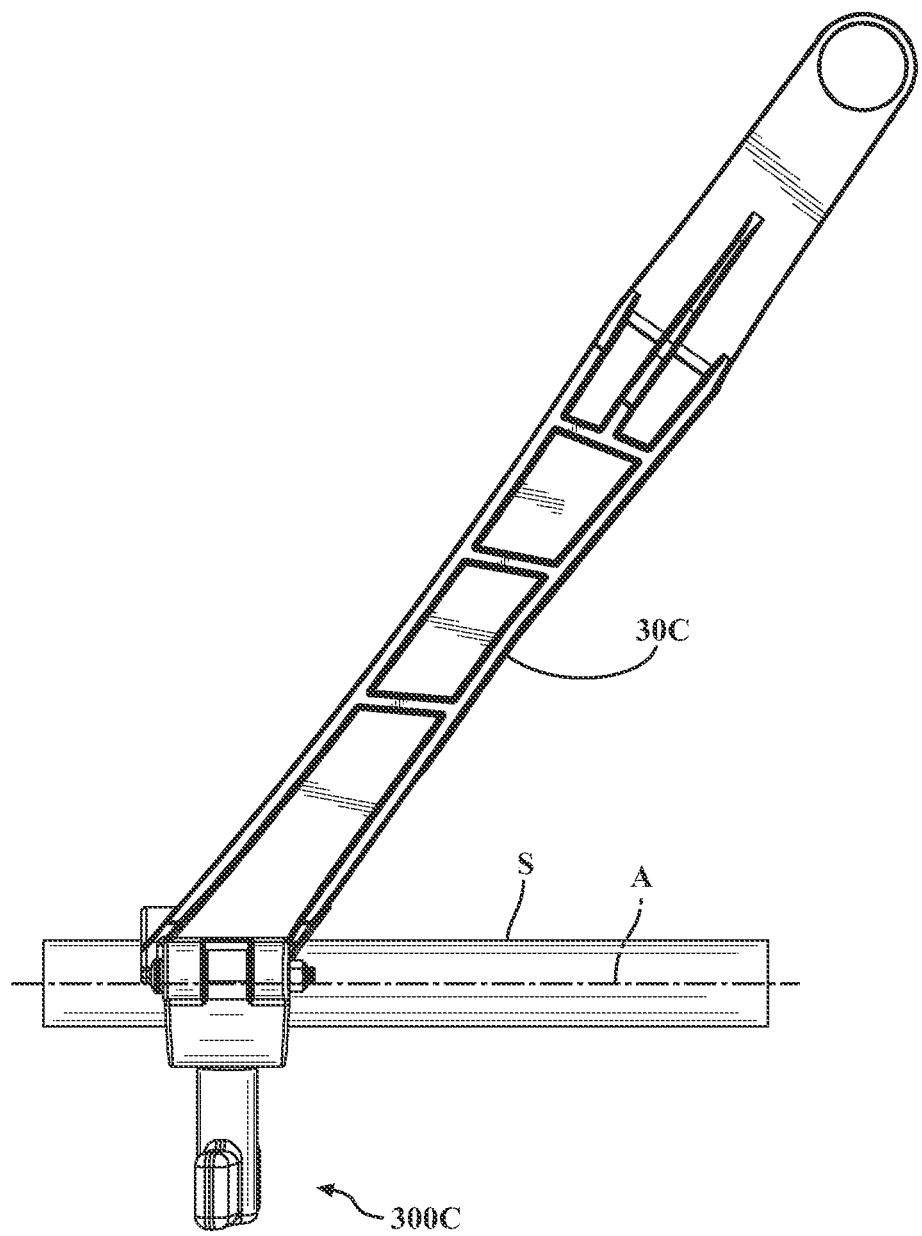
FIG. 13 is a perspective view of an auxiliary attachment according to another disclosed non-limiting embodiment.

Alternatively, in another embodiment, the auxiliary attachment 20 may include a single unitary body 30C with a single clamp structure 300C (FIG. 13) as described above. Various combinations of body and clamp structures may be used in various combinations to, for example, be configured for a specific tool.

Figure 14:
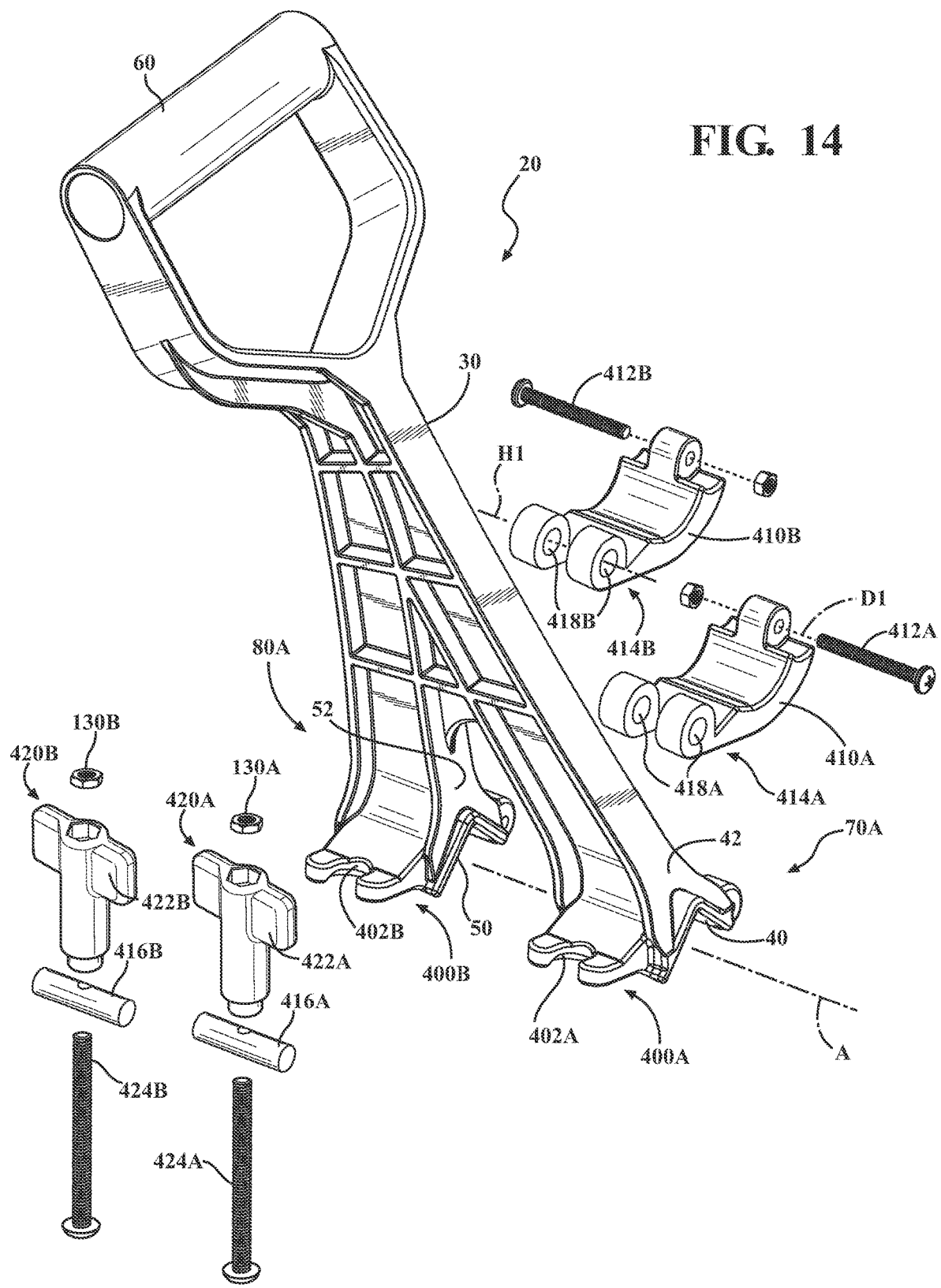
FIG. 14 is an exploded view of a clamp structure according to another disclosed non-limiting embodiment.
Figure 15:
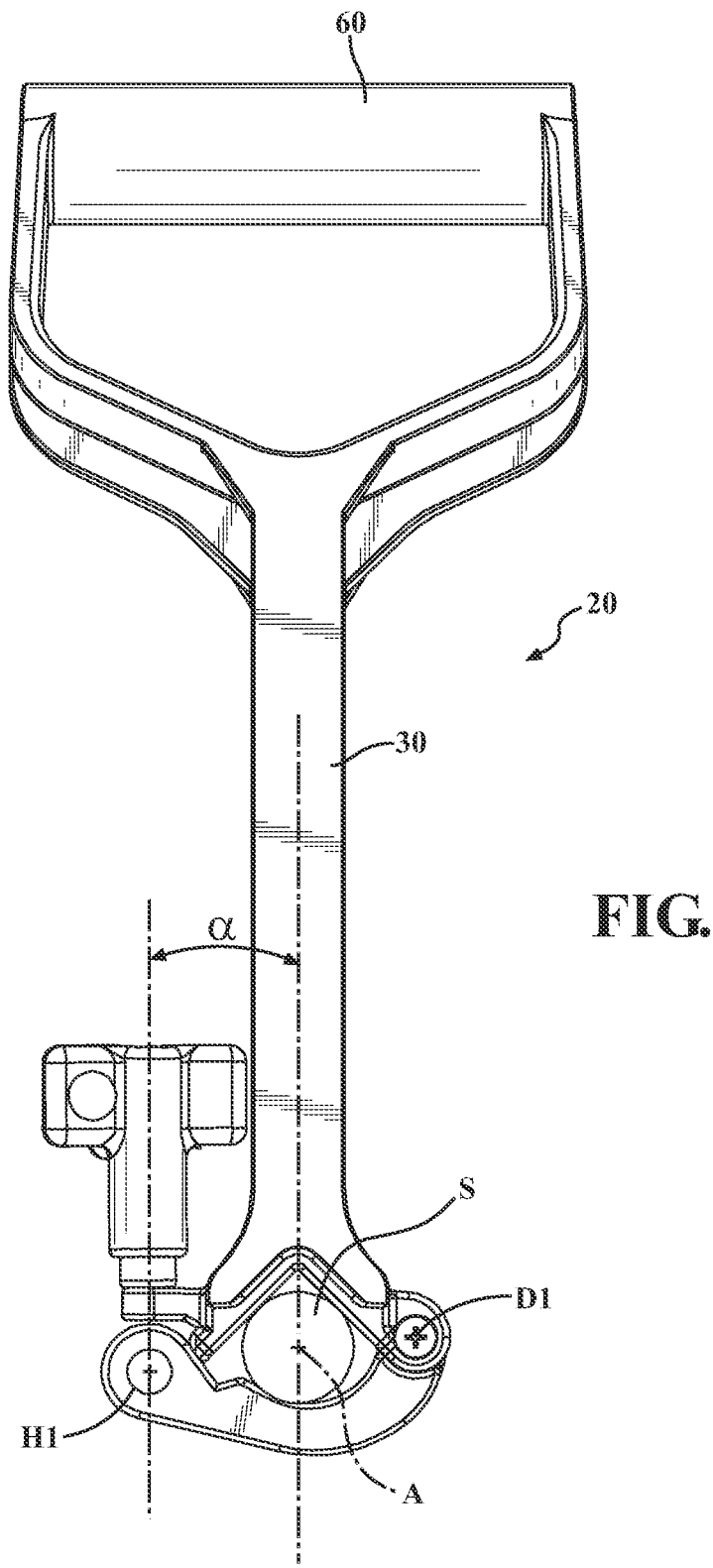
FIG. 15 is a front view of the clamp structure of FIG. 14.

With reference to FIG. 14, in another embodiment, a first clamp structure 70A is attached to the first channel member 42 to clamp the member S to the first channel closed side 40 (FIG. 15). A second clamp structure 80A is attached to the second channel member 52 to clamp the member S to the second channel closed side 50 (FIG. 15). The first and second clamp structure 70A, 80A each include a fixed female member 400A, 400B that is fixed adjacent to the respective first channel member 42 and the second channel member 52. The fixed female member 400A, 400B each extend transverse to the axis A. In other words, the fixed female member 400A, 400B forms an extended tab with a respective slot 402A, 402B.

The first and second clamp structure 70A, 80A each include a first male member arm 410A, 410B, that pivots about a first male member arm axis D1 (FIG. 15) parallel to the axis A. The first male member arm 410A, 410B includes a body pivot 412A, 412B and a T-handle pivot 414A, 414B. The body pivot 412A, 412B is defined along the first male member arm axis D1. The T-handle pivot 414A, 414B is defined along an arm axis H1 (FIG. 15). The first male member arm axis D1 and the arm axis H1 are parallel to the axis A.

The body pivot 412A, 412B and the T-handle pivot 414A, 414B may be defined by pins, screws, or other such bushings to provide a strong, secure attachment. The body pivot 412A, 412B is respectively received into the body 30 and the first male member arm 410A, 410B. The T-handle pivot 414A, 414B is respectively received into the first male member arm 410A, 410B. The T-handle pivot 414A, 414B, in this example, is formed by a pin 416A, 416B that is received into a set of apertures 418A, 418B in the first male member arm 410A, 410B.

A wing nut 420A, 420B include a respective set of wings 422A, 422B which allow for hand tightening of each wing nut 420A, 420B onto a respective threaded fastener 424A, 424B. Each threaded fastener 424A, 424B extends through the respective pin 416A, 416B and through the respective wing nut 420A, 420B. A nut 130A, 130B is retained against a shelf 120 (FIG. 6) within a corresponding opening in the wing nut 420A, 420B as described above.

The wing nut 420A, 420B, in this embodiment, each extends upwards toward the body 30 and away from the axis A to provide a compact design which affords more clearance for the tool (FIG. 15). In one embodiment the wing nut 420A, 420B defines an angle alpha that is within 15 degrees of parallel with the body 30 (FIG. 15) when the wing nut 420A, 420B is threadably engaged to the respective fixed female member 400A, 400B. That is, the wing nut 420A, 420B is tightened onto the threaded fastener 424A, 424B to engage the fixed female member 400A, 400B.

In use, the member S is placed against the first channel closed side 40 and the second channel closed side 50 along the axis A. Each male member arm 410A, 410B is then pivoted about the male member arm axis D1. The wing nut 420A, 420B is then pivoted about the respective arm axis H1 such that the threaded fastener 424A, 424B is received into the respective slot 402A, 402B. The wing nut 420A, 420B is then tightened along the respective threaded fastener 424A, 424B such that each wing nut 420A, 420B is engaged against the respective fixed female member 400A, 400B to clamp the member S.

The auxiliary attachment 20 is easily attached and detached from the member S yet provides a secure engagement. In one example, the tool T may be used by grasping the auxiliary attachment 20 with one hand and the tool with the other hand. The extension of the handle 60 from the body 30 transverse to the axis A allows the user to control the tool without requiring the user to bend over substantially.

Figure 16:
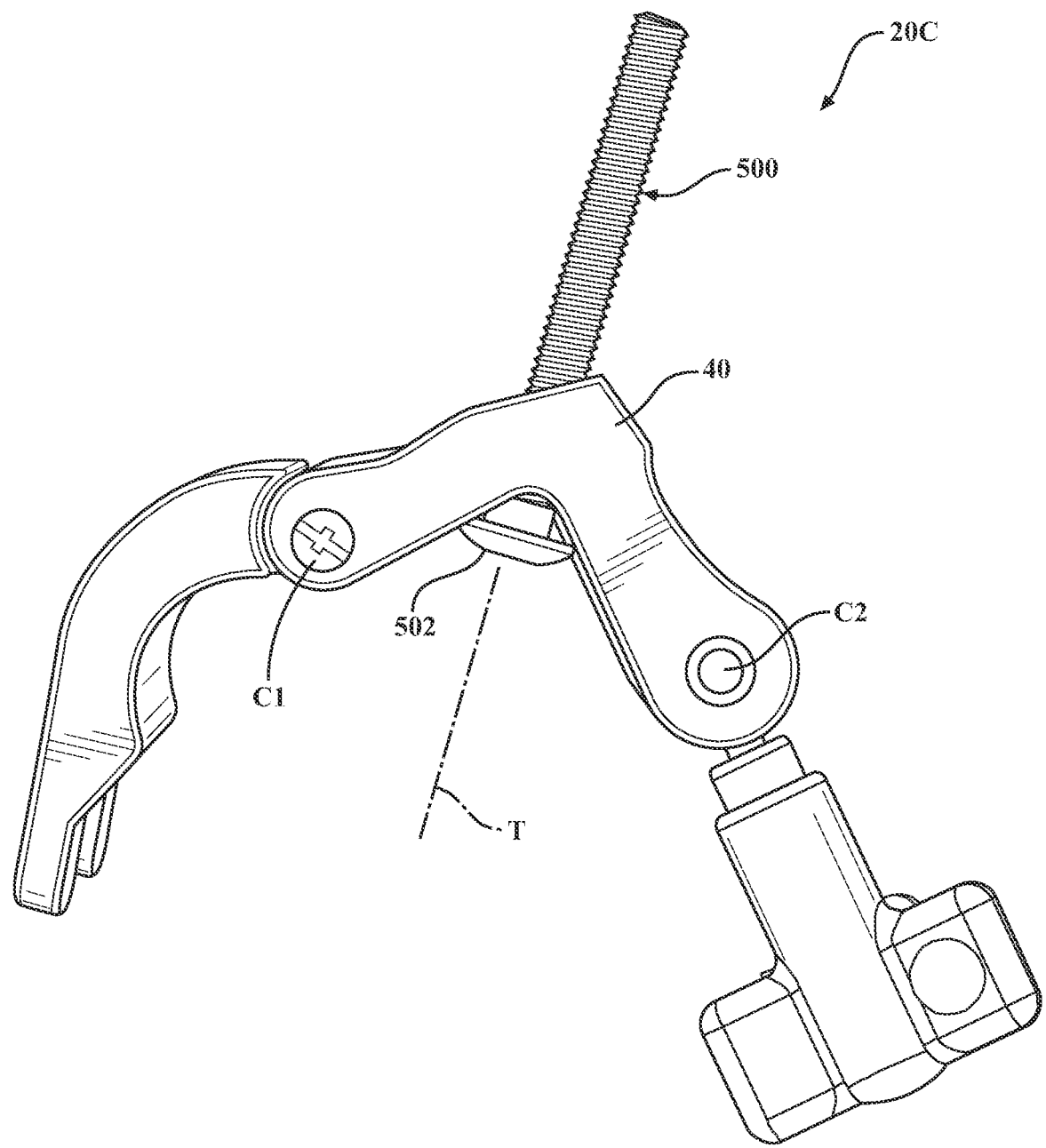
FIG. 16 is a perspective view of the clamp structure of FIG. 1C.

With reference to FIG. 16, in another embodiment, and as generally described above, an auxiliary attachment 20C may include a female member 72 that pivots about a female member axis C1 with respect to the first channel closed side 40 and a male member 74 that pivots about a male member axis C2 with respect to the first channel closed side 40. In one embodiment, the first channel closed side 40 may be of a V-shape to abut the member S along the axis A (FIG. 1C).

The female member axis C1 and the male member axis C2 are parallel to the axis A. A threaded member 500 may be affixed through the first channel closed side 40 along an axis T transverse to the axes C1, C2. The threaded member 500 may be removable, and/or affixed within the first channel closed side 40. The threaded member 500 may be manufactured of a metal alloy while the first channel closed side 40 may be manufactured of a non-metallic material.

In one embodiment, the threaded member 500 may include a head 502 that is captured within the first channel closed side 40. The head 502 may be located within the bottom of the V-shape and across the apex thereof. The head 502 may provide a metal surface that cuts across the apex thereof to abut the member S. The head 502 may be convex or of another shape such as rectilinear, convex, flat, etc., to, for example, correspond with that of the member S. That is, the head 502 may provide a metal alloy abutment surface for the member S to provide durability, etc.

Figure 1C:
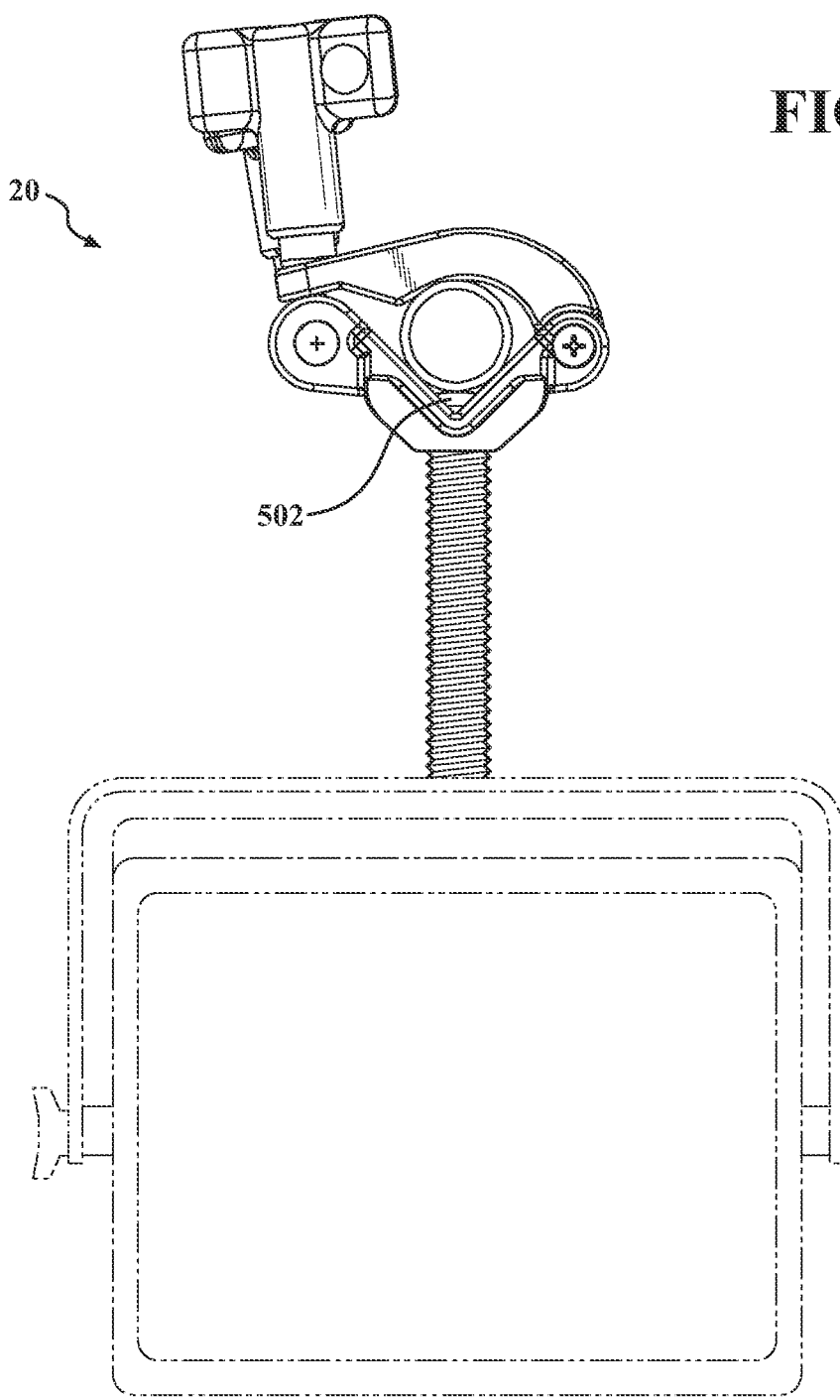
FIG. 1C is a perspective view of the auxiliary attachment attached to a member that is a part of an example light assembly.

The auxiliary attachment 20C may also be used to hang or otherwise store that to which it is attached such as the member S of an assembly such as the light assembly (FIG. 1C). The threaded member 500 permits the auxiliary attachment 20C to be threaded to a support, then the light assembly or other structure attached thereafter.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A clamp assembly, comprising:
   a first clamp structure comprising:
      a first channel member comprising a first channel closed side along an axis to receive an elongated member along the axis;
      a first female member adjacent to the first channel member, the first female member pivots about a first female member axis parallel to the axis;
      a male member mounted along a first male member axis parallel to the axis;
      a threaded fastener that extends through the male member transverse to the first male member axis; and
      a first wing nut threaded to the threaded fastener;
      wherein the first wing nut is partially received within a first slot in the first female member to clamp the first female member against the elongated member to clamp the elongated member against the first channel closed side.

2. The clamp assembly as recited in claim 1, wherein the elongated member comprises a portion of a device.

3. The clamp assembly as recited in claim 1, further comprising:
   a second clamp structure coaxial with the first clamp structure to clamp the elongated member to a second channel member comprising a second channel closed side, the first channel closed side aligned with the second channel closed side along the axis to collectively receive the elongated member along the axis.

4. The clamp assembly as recited in claim 3, wherein the first channel closed side forms a V-shape and the second channel closed side forms a V-shape.

5. The clamp assembly as recited in claim 4, wherein the first channel closed side is contiguous with the second channel closed side.

6. The clamp assembly as recited in claim 5, further comprising:
   a body transverse to the axis; and
   a handle that extends from the body.

7. The clamp assembly as recited in claim 6, wherein the body is unitary.

8. The clamp assembly as recited in claim 6, wherein the body extends between the first channel closed side and the second channel closed side.

9. The clamp assembly as recited in claim 1, further comprising a threaded member attached to the first channel closed side transverse to the first male member axis and the first female member axis.

10. The clamp assembly as recited in claim 9, further comprising a head on the threaded member, the head captured within the first channel closed side.

11. The clamp assembly as recited in claim 10, wherein the first channel closed side forms a V-shape.

12. The clamp assembly as recited in claim 11, wherein the head is located within the V-shape.

13. The clamp assembly as recited in claim 12, wherein the head is convex.

14. The clamp assembly as recited in claim 11, wherein the threaded member is manufactured of a metal alloy and the first channel closed side is manufactured of a non-metallic material.

15. A clamp assembly, comprising:
    a first clamp structure comprising:
    a first channel member comprising a first channel closed side along an axis to receive an elongated member along the axis;
    a first female member adjacent to the first channel member;
    a first male member arm that pivots about a first male member axis parallel to the axis;
    a T-handle pivot along the first male member arm to define an arm axis parallel to the axis;

a threaded fastener that extends through the T-handle pivot; and a first wing nut mounted to the threaded fastener, the first male member arm pivotable about the first male member axis and the first wing nut pivotable about the arm axis such that the first wing nut is partially received within a first slot in the first female member to clamp the first female member against the member to clamp the member against the first channel closed side.

16. The clamp assembly as recited in claim 15, further comprising:

a body transverse to the axis; and a handle that extends from the body, the wing nut extends upwards toward the body and away from the axis when secured to the first female member.

17. The clamp assembly as recited in claim 16, wherein the wing nut is within 15 degrees of parallel with the body.

18. An auxiliary attachment, comprising:

a first channel member comprising a first channel closed side along an axis to receive a member along the axis;

a first clamp structure attached to the first channel member to clamp the member to the first channel closed side;

a body transverse to the axis; and a handle that extends from the body;

wherein the first clamp structure comprises a first female member that pivots about a first female member axis and a first male member that pivots about a first male member axis, the first female member axis and the first male member axis parallel to the axis.

19. The auxiliary attachment as recited in claim 18, wherein the first male member comprises a threaded fastener transverse to the first male member axis and a first wing nut threaded to the threaded fastener.

20. The auxiliary attachment as recited in claim 19, wherein the first channel member comprises a first channel closed side forming a V-shape.

21. The auxiliary attachment as recited in claim 18, further comprising a second clamp structure coaxial with the first clamp structure to clamp the member.

22. The auxiliary attachment as recited in claim 21, further comprising a second channel member comprising a second channel closed side, the first channel closed side aligned with the second channel closed side along the axis to collectively receive the member along the axis.

23. The auxiliary attachment as recited in claim 22, wherein the first channel closed side forms a V-shape and the second channel closed side forms a V-shape.

24. The auxiliary attachment as recited in claim 23, wherein the first channel closed side is contiguous with the second channel closed side.

* * * * *